United States Patent
Walker et al.

(10) Patent No.: US 7,082,237 B2
(45) Date of Patent: Jul. 25, 2006

(54) OPTICAL MODULATORS OPERATED IN PARALLEL PUSH-PULL MODE

(75) Inventors: Robert Graham Walker, Northampton (GB); Andrew Cannon Carter, Northampton (GB)

(73) Assignee: Bookham Technology, plc, Abingdon (GB)

( * ) Notice: Subject to any disclaimer, the term of this patent is extended or adjusted under 35 U.S.C. 154(b) by 0 days.

(21) Appl. No.: 10/501,807

(22) PCT Filed: Jan. 20, 2003

(86) PCT No.: PCT/GB03/00214

§ 371 (c)(1),
(2), (4) Date: Jul. 19, 2004

(87) PCT Pub. No.: WO03/062914

PCT Pub. Date: Jul. 31, 2003

(65) Prior Publication Data

US 2005/0123242 A1    Jun. 9, 2005

(30) Foreign Application Priority Data

Jan. 19, 2002   (GB) ................................ 0201203.7

(51) Int. Cl.
G02F 1/01    (2006.01)
G02F 1/35    (2006.01)
G02B 6/12    (2006.01)
G02B 6/42    (2006.01)
G02B 6/26    (2006.01)

(52) U.S. Cl. ...................... 385/40; 385/1; 385/2; 385/3; 385/14; 385/15; 385/39; 385/41

(58) Field of Classification Search ................ 385/1–3, 385/14, 15, 39–41
See application file for complete search history.

(56) References Cited

U.S. PATENT DOCUMENTS 5,535,045 A    7/1996  Dutta et al.

(Continued)

FOREIGN PATENT DOCUMENTS

EP    0881526 A2    12/1998

(Continued)

OTHER PUBLICATIONS

Walker, Robert, "High-Speed III-V Semiconductor Intensity Modulators," *IEEE Journal of Quantum Electronics*, 27(3):654–667 (Mar. 1991).

(Continued)

*Primary Examiner*—Brian Healy
*Assistant Examiner*—Jerry Martin Blevins
(74) *Attorney, Agent, or Firm*—Lahive & Cockfield, LLP; Anthony A. Laurentano, Esq.

(57) ABSTRACT

A Mach-Zehnder interferometer modulator for modulating a beam of laser light includes a pair of separate waveguides through which the laser light is passed after splitting in a splitting zone and after which the light is recombined in a merge zone. The waveguides are formed in a semiconductor material with one of the electrodes of each pair being formed in a doped layer while the other electrode, the top electrode, is a surface metalisation. The doped layer is trenched so that adjacent electrodes in the doped layer are electrically isolated from one another so that one of the electrodes in the doped layer can be connected with a different electrical polarity to the other electrode in the doped layer thereby permitting the connection of the pairs of electrodes in parallel anti-phase mode.

15 Claims, 13 Drawing Sheets

U.S. PATENT DOCUMENTS 5,757,985 A * 5/1998 Ishizaka .................. 385/2
6,122,414 A * 9/2000 Shimizu .................. 385/2

FOREIGN PATENT DOCUMENTS

| EP | 0677765 B1 | 7/2001 |
| GB | 2361071 | 10/2001 |
| GB | 2361071 A * | 10/2001 |
| WO | WO-01/77741 A2 | 10/2001 |

OTHER PUBLICATIONS

Spickermann, R. et al., "GaAs/AlGaAs electro-optic modulator with bandwith>40 GHz," *Electronic Letters*, 31(11):915-916 (May 1995).

* cited by examiner

OPTICAL MODULATORS OPERATED IN PARALLEL PUSH-PULL MODE

RELATED APPLICATIONS

This application is a 35 U.S.C. 371 national stage filing of International Application No. PCT/GB03/00214, filed 20 Jan. 2003, which claims priority to Great Britain Patent Application No. 0201203.7 filed on 19 Jan. 2002, in Great Britain. The contents of the aforementioned applications are hereby incorporated by reference.

This invention relates to modulators and has particular reference to modulators for modulating laser light.

BACKGROUND TO THE INVENTION

In this specification the term "light" will be used in the sense that it is used in optical systems to mean not just visible light but also electromagnetic radiation having a wavelength between 800 nanometres (nm) and 3000 nm.

Optical fibre based systems are the norm for high data-rate trunk and increasingly, local area networks (LAN) telecommunications. With 10 Gbit/s systems in the ascendant and 40 Gb/s on the near horizon, copper-based systems are not an option even for relatively short links; coaxial cable with losses around 3 dB/m at 30 GHz cannot compete with the fraction of a dB/km of optical fibre. There are also important issues of dispersion and cost.

High bit-rates and the need for wavelength finesse and stability preclude the use of direct laser modulation for such systems and external modulation of an extant laser beam is required. The present invention is concerned with a modulator for use in such a system. The concept of integrated optical (or 'photonic') circuits is not new but, until recently, commercial—and hence telecom systems—use was limited to relatively simple devices, primarily lithium-niobate modulators, which are available from several commercial sources.

The basic element of these modulator devices is the guided wave Mach-Zehnder interferometer. These devices can be regarded as a pair of parallel optical waveguides fed by a splitter and leading to a recombiner. The two parallel waveguides are formed of a material with electro-optic properties; that is a material whose refractive index can be varied in response to an electrical field (E-field) across the material. The speed of light in a material is inversely proportional to the refractive index, n, of the material through which the light is propagating.

Thus if the light passing through one of the parallel waveguides encounters a different refractive index, n, compared to light passing through the other, it is differentially delayed or shifted in phase. When the light from the parallel waveguides is suitably recombined the resultant coherent interference can be arranged to provide intensity modulation of the original light source.

Because the change in n is very rapid in a suitable electro-optic material, the modulator can be used to modulate at very high frequencies, up to beyond 100 GHz.

The free space optical wavelengths of interest, which are modulated using the present invention, are usually in the range 800 to 2000 nm.

Modulators based on Mach-Zehnder interferometers (MZI) have been developed in both the non-semiconducting ferro-electric materials such as lithium niobate and in semi-conducting materials, especially the III–V semiconductors such as GaAs materials.

There is a fundamental difference between the manner in which these MZI devices are produced in the two materials. The MZI devices formed of lithium niobate are produced with co-planar electrodes formed on what is conventionally shown as the upper surface of the lithium niobate material with the parallel waveguides which form the arms of the MZI device located in the lithium niobate material below and between the parallel electrodes. In contrast, because semi-conductor MZI devices are produced by laminar epitaxial growth. Optionally an electrode in such semi-conductor MZI devices may be grown into the base of the layer containing the waveguides. These designs are referred to here as back-electrode designs. This grown back-electrode of doped, conductive semiconductor material, works together with metallic surface electrodes to enhance the efficiency of the electro-optic interaction.

This fundamental difference in design is shown clearly in FIG. 3 of the paper "High Speed III–V Semiconductor Intensity Modulators by R G Walker IEEE Journal of Quantum Electronics, Vol. 27, No 3. March 1991 pp 657 to 667 [herein Reference 1]. This Figure shows the difference in structure between the co-planar electrodes of the lithium niobate MZI device and the back electrodes of the semiconductor device such as the GaAs/ALGaAs devices.

This paper also shows a further fundamental difference between the two types of MZI devices in that the co-planar electrode MZI device such as the lithium niobate MZI device can easily be arranged to be in parallel push-pull format, whereas the semiconductor MZI devices are normally only arranged in series push-pull. Parallel push-pull as shown in FIG. 3 of Reference 1, entails cross-connection of the two arms in parallel (conceptually each being represented by a capacitor), and driving them from a single RF source (voltage V/2) such that they work in anti-phase. Series push-pull as shown in FIG. 3 of Reference 1, entails series connection of the two arms (conceptually each being represented by a capacitor), and driving them from a single RF source (voltage V) such that they work in anti-phase.

Operation in push-pull is to be preferred in MZI modulators and there are also certain advantages in operating in parallel push-pull rather than in series push-pull particularly where the RF power rather than bandwidth is of prime concern and where the waveguide capacitance can be made very low by other means.

In lithium niobate devices, see the paper "A review of Lithium Niobate Modulators for Fiber-Optic Communications Systems" by Wooten et. al., IEEE Journal of Selected Topics in Quantum Electronics, Vol. 6, No. 1, January/February 2000 PP 69 to 82, FIGS. 3a and 3b, co-planar waveguide (CPW) electrode structures with a central 'hot' and two outer 'ground' rails are typically used to apply lateral E-field components to two waveguides from left to right and from right to left respectively. FIGS. 3c and 3d of this reference represent approaches in lithium niobate to series and dual-drive push-pull electrode configurations.

In III–V semiconductors lateral fields are not favoured in the normal <100> crystal-cut as this gives a polarisation-rotation effect rather than phase modulation. However, an arrangement of electrodes is possible, see the paper GaAs/AlGaAs electro-optic modulator with bandwidth >40 GHz, Electronics Letters, Vol. 31, No 11, 25$^{th}$ May 1995, pp 915 to 916, in which the E-fields are directed down through one waveguide and up through the other. This also is a type of parallel push-pull configuration but it is inefficient and the field lies neither perfectly vertical, nor laterally symmetric, and as a result parasitic polarization effects occur. Further this design is not a back-electrode design and as such it is not efficient, but such a design does not require isolation trenching.

Because of the different geometry of the two types of MZI modulators, only the MZI modulators of the co-planar type such as the lithium niobate based modulators have conventionally been able to be operated in parallel push-pull mode heretofore, and the back-electrode designs which are fabricated in semiconductor materials have been operated in series push-pull mode.

The present invention overcomes this limitation and provides a means for operating a doped semiconductor material based MZI modulator in parallel push-pull mode. Amongst other advantages, this is desirable because, compared to competing non-semiconductor materials such as lithium-niobate and polymers, semiconductor materials such as III–V materials are environmentally stable over temperature, time, and stress, with negligible D.C. drift. They also have a high optical power tolerance and a process-route that allows waveguides of differing properties to be combined on one substrate.

The present invention provides means whereby the high efficiency advantages of the doped, multi-layer III–V semiconductor waveguide may be retained in a parallel push-pull configuration.

BRIEF DESCRIPTION OF THE INVENTION

By the present invention there is a provided a Mach-Zehnder interferometer modulator for modulating a beam of laser light, the modulator including a pair of separate waveguides through which the laser light is passed after splitting in a splitting zone and after which the light is recombined in a merge zone, the waveguides being formed of a material having electro-optic properties and there being provided opposed pairs of electrodes electrically located so as to be able to effect optical changes within the material of the waveguides, characterised in that the waveguides are formed in a semiconductor material with one of the electrodes of each pair being formed in a doped layer, said doped layer being of relatively high conductivity compared to the semiconductor material, buried within or below the waveguide material whilst the other electrode, the top electrode, is a surface metalisation, the doped layer being trenched so that adjacent electrodes in the doped layer are electrically isolated from one another so that one of the electrodes in the doped layer can be connected with a different electrical polarity to the other electrode in the doped layer thereby permitting the connection of the pairs of electrodes in parallel anti-phase mode.

The modulator may include a coplanar stripline transmission-line for an RF signal comprising a pair of metal rails arranged on either side of the Mach-Zehnder Interferometer waveguide-pair, each rail effecting direct contact to the buried electrode of the adjacent waveguide while also effecting contact to the top electrode of the remote waveguide by means of metal linkages passing through or over the adjacent waveguide.

Alternatively the modulator may include a coplanar waveguide transmission-line for an RF signal comprising three rails, a central rail at one potential and located between the waveguides, and two outer rails at the same, second, potential which differs from the first potential, with each waveguide of the Mach-Zehnder Interferometer waveguide-pair running in one of the two inter-rail gaps, the central rail effecting direct contact to the buried electrode of the first waveguide and contacting the top electrode of the second waveguide by means of metal linkages, the top electrode of the first waveguide being contacted by means of metal linkages from the first outer rail, and the second outer rail being in direct contact to the buried electrode of the second waveguide.

The doped layer may extend beneath the first outer rail, and there may be provided a trench through the doped layer so as to isolate the region of the doped layer beneath the first waveguide from that beneath the first outer rail.

In a further embodiment of the invention, the modulator may include a coplanar stripline transmission-line for an RF signal comprising a pair of metal rails arranged on either side of the Mach-Zehnder Interferometer waveguide-pair, each rail having a width sufficient to enable capacitive connection to the buried electrode over which it is located and effecting thereby high frequency contact to the buried electrode of the adjacent waveguide while also effecting contact to the top electrode of the remote waveguide by means of metal linkages passing through or over the adjacent waveguide.

Alternatively, the modulator may include a coplanar waveguide transmission-line for an RF signal comprising three rails, a central rail at one potential and located between the waveguides, and two outer rails at the same, second, potential, with each waveguide of the Mach-Zehnder Interferometer waveguide-pair running in one of the two inter-rail gaps, the central rail and one of the outer rails being of sufficient width to enable those rails to make capacitance contact with their opposed buried electrodes, the central rail effecting capacitive contact to the buried electrode of the first waveguide and contacting the top electrode of the second waveguide by means of metal linkages, the top electrode of the first waveguide being contacted by means of metal linkages from first outer rail, and the second outer rail being in capacitive contact to the buried electrode of the second waveguide, the capacitive contacts being effective electrical contacts for high frequency alternating signals. The doped layer may extend beneath the first outer rail, and there may be provided a trench through the doped layer so as to isolate the region of the doped layer beneath the first waveguide from that beneath the first outer rail.

There may be provided a passive waveguide region trenched as in the active regions between the active regions and the merge zone. There may further be provided a passive waveguide region trenched as in the active regions between the active regions and the splitter zone The conductivity in the doped area may be locally removed in the region of the merge zone. The conductivity in the doped area may locally removed in the region of the splitter zone.

The semiconductor material may be based on GaAs, and the waveguides may be formed in GaAs bounded by layers of AlGaAs. The semiconductor material may be selected from the group InGaAsP, or GaInAsP or GaAlInP and the bounding layer may be InP.

The electrode formed by surface metalisation may be a Schottky rectifying contact, or may an ohmic contact to a p-doped under layer.

BRIEF DESCRIPTION OF THE DRAWINGS

In FIG. 1a there is shown the basic concept behind such a modulator. A splitter unit 11 splits the input light beam 10, so as to divide the light into two separate paths 12 and 13. The light is recombined at 14 to reform as beams 15 and 16.

Figure 1A:
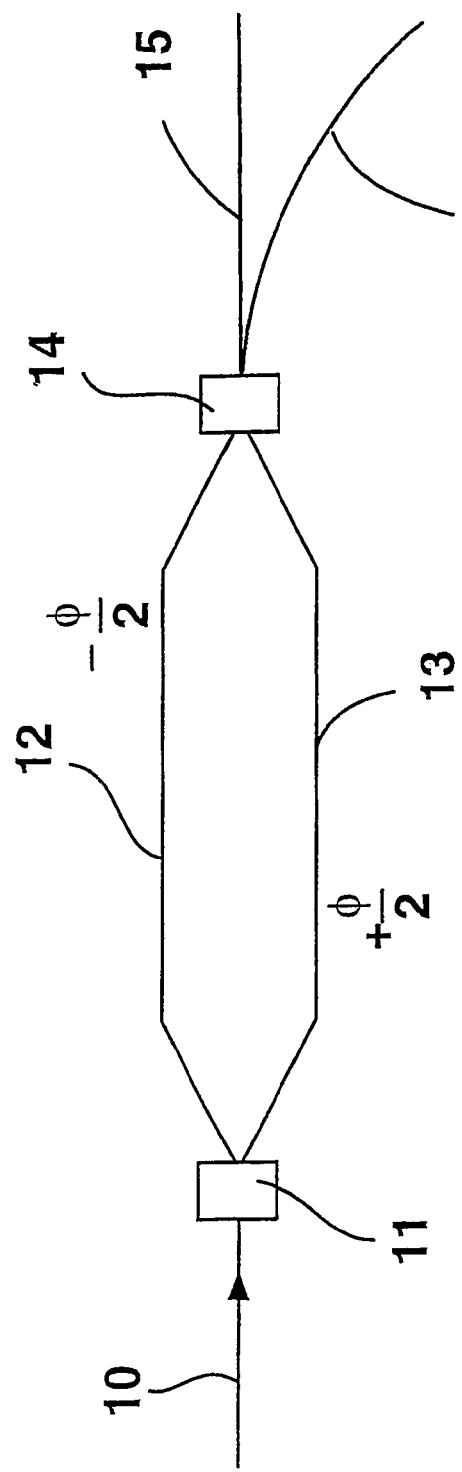
FIG. 1a is a schematic diagram of the Mach-Zehnder interferometric modulator.
Figure 1B:
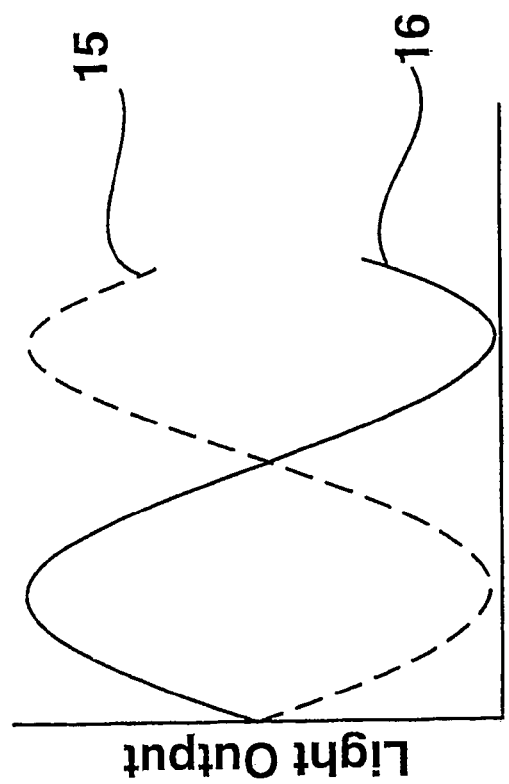
FIG. 1b is a graph of light output vs. differential phase

By differentially phase shifting or delaying the light in the paths 12 and 13, for example so that light in path 12 is phase shifted by +ϕ/2 and light in path 13 is shifted by −ϕ/2 the light when recombined can be apportioned between two output ports 15 and 16 according to the degree of the phase shift as shown in FIG. 1b. A suitable degree of phase shift can result in the routing of the light entirely from on port to another in a cyclical manner. If the differential changes to the light in the paths 12 and 13 is carried out by, or in response to, a desired signal, this apportioning results in modulation at one or other port. There are several structures available for this recombination, examples of which include directional couplers and Y-junctions and multimode interference couplers. In three port couplers such as a Y-junction, the second port 16 is comprised a free radiation.

Figure 2A:
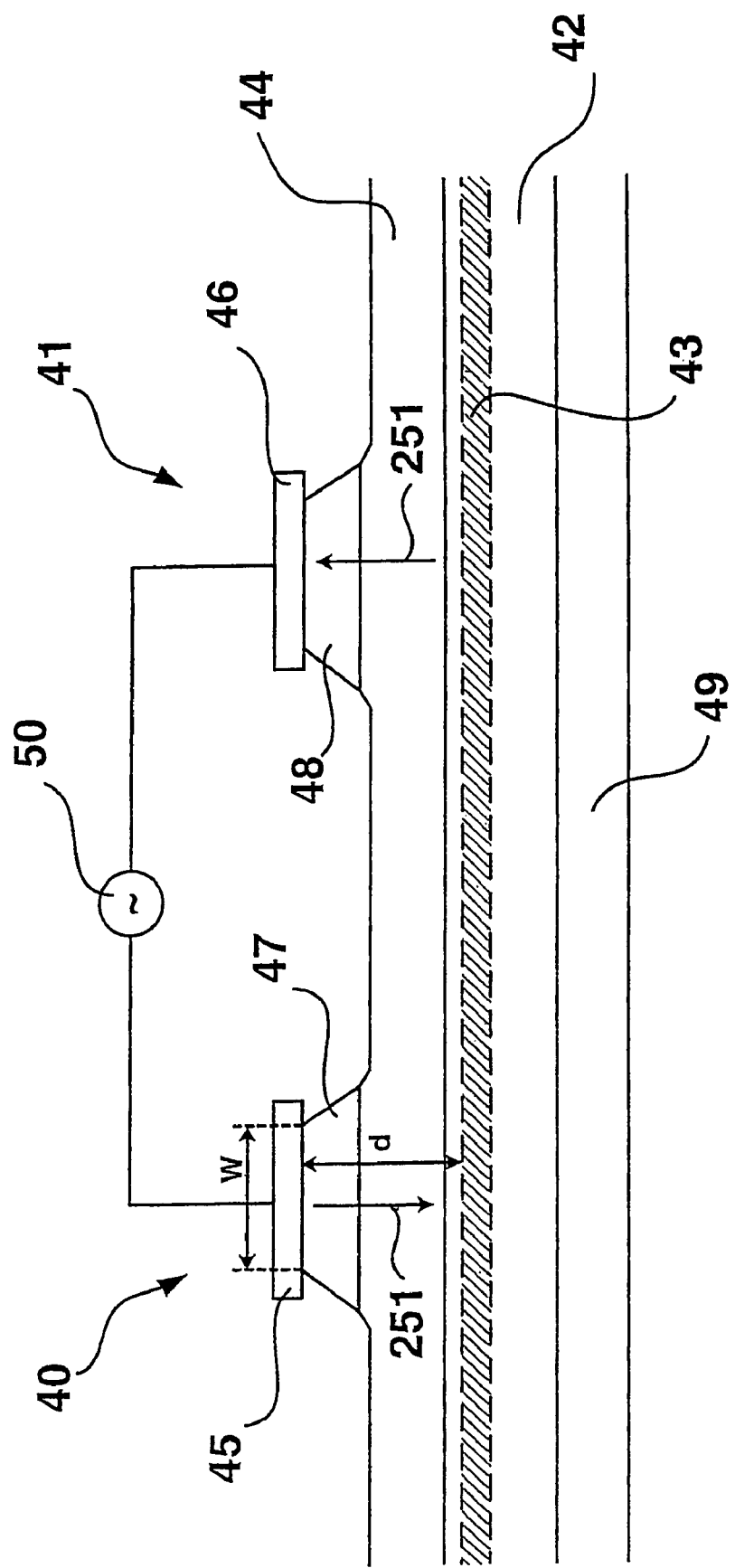
FIG. 2 illustrates a cross section of a part of a series push-pull modulator based in semiconductor.
FIG. 2b shows a cross section of a part of a series push-pull modulator based in semiconductor detailing the guided light profiles.

As will be explained below, the waveguides are provided with electrodes to establish the required electric fields across the waveguides. The linear electro-optic effect naturally provides a refractive-index change whose magnitude and direction is sensitive to the orientation of the applied electric field. Thus, beneficially, the E-field can be dropped across the two waveguides in opposing directions in order that one will experience phase retardation while the other experiences a phase advance of equal magnitude FIG. 2 is a cross-section of a basic Mach-Zehnder interferometer modulator fabricated in the GaAs (gallium arsenide) material system. A GaAs substrate 49 has formed on it a sequence of AlGaAs and GaAs layers to form a 1D (slab) optical waveguide. The refractive index of AlGaAs is lower than that of GaAs (the difference increasing with the aluminium content of the AlGaAs); accordingly the layer-sequence comprises:

i. An AlGaAs lower-cladding layer 42, sufficiently thick to prevent optical leakage into the high-index substrate
 ii. A GaAs core layer 44 within which the light is largely confined.
 iii. An AlGaAs upper-cladding layer (47, 48) whose composition need not be the same as that of the lower-cladding.

In semiconductor materials, it is possible to define regions of electrical conductivity by means of impurity doping. Accordingly, there is superimposed onto the refractive-index profile due to the aluminium content, an independent conductivity profile due to impurity doping. Here, n-type doping, providing a surplus of free electrons, due to traces of silicon is used to provide a conductive region 43 beneath the plane of the waveguides. This may be wholly within layer 42, as drawn, or may straddle the layer 43/44 interface depending upon the desired device characteristics. Moreover, the doped region may contain a diversity of conductivities if desired in order to optimise the properties of the structure. The bulk of the waveguide is comprised of undoped material, having background free-carrier levels only.

Lateral confinement of the light is due to etched ribs 47 and 48. Typically, but not of necessity, a pattern of deposited metal electrodes, 45 and 46, may be used as the etch-mask to define these ribs, thereby providing self-aligned electrodes for the electro-optic functionality. Where electrodes are not required they are subsequently removed by selective etching using an etchant to which the semiconductor is impervious.

Alternatively electrodes 45 and 46 may be deposited by any convenient means onto pre-existing waveguides.

Electrodes 45 and 46 comprise metal-to-semiconductor contacts that, on undoped AlGaAs, possess rectifying (Schottky) properties. When reverse-biased, electrodes 45 and 46 are negative with respect to the doped layer 43, residual free-carriers are depleted from the undoped waveguide regions and the electric-field falls directly through the waveguide terminating at the doped layer 43.

In InP-based III–V semiconductor systems, it may be desirable to apply p-type doping to the rib surface below the electrode as good rectifying metal-to-semiconductor junctions are otherwise difficult to achieve in those materials.

Figure 2B:
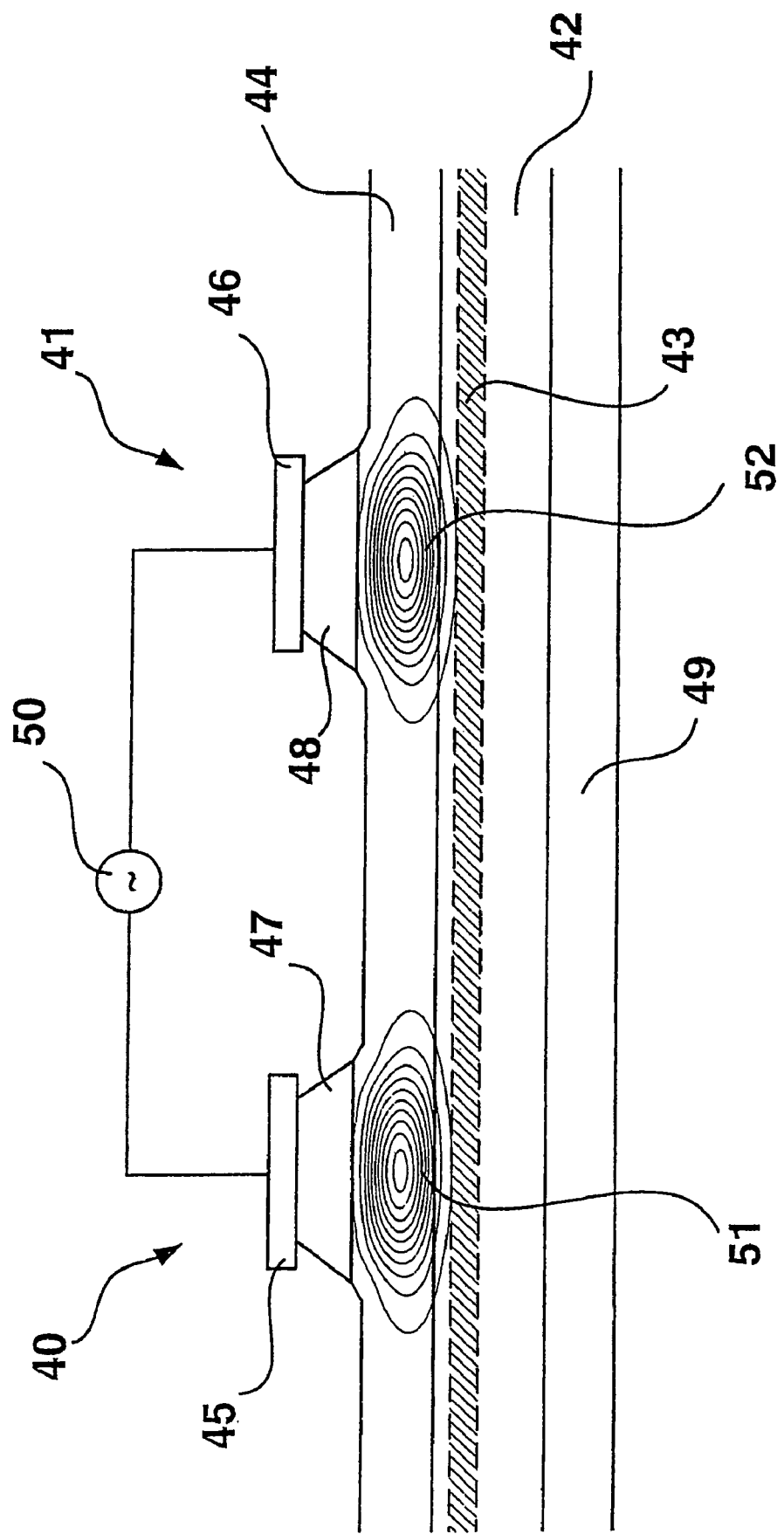

FIG. 2b shows the location of the guided light in the active GaAs core layer 44. The regions of contoured lines 51 and 52 show the light intensity profile. The profiles show that the vertical confinement of the light is tighter than the lateral confinement and that the lateral spread of the light is beyond the "confines" of the etched rib of AlGaAs.

Figure 3:
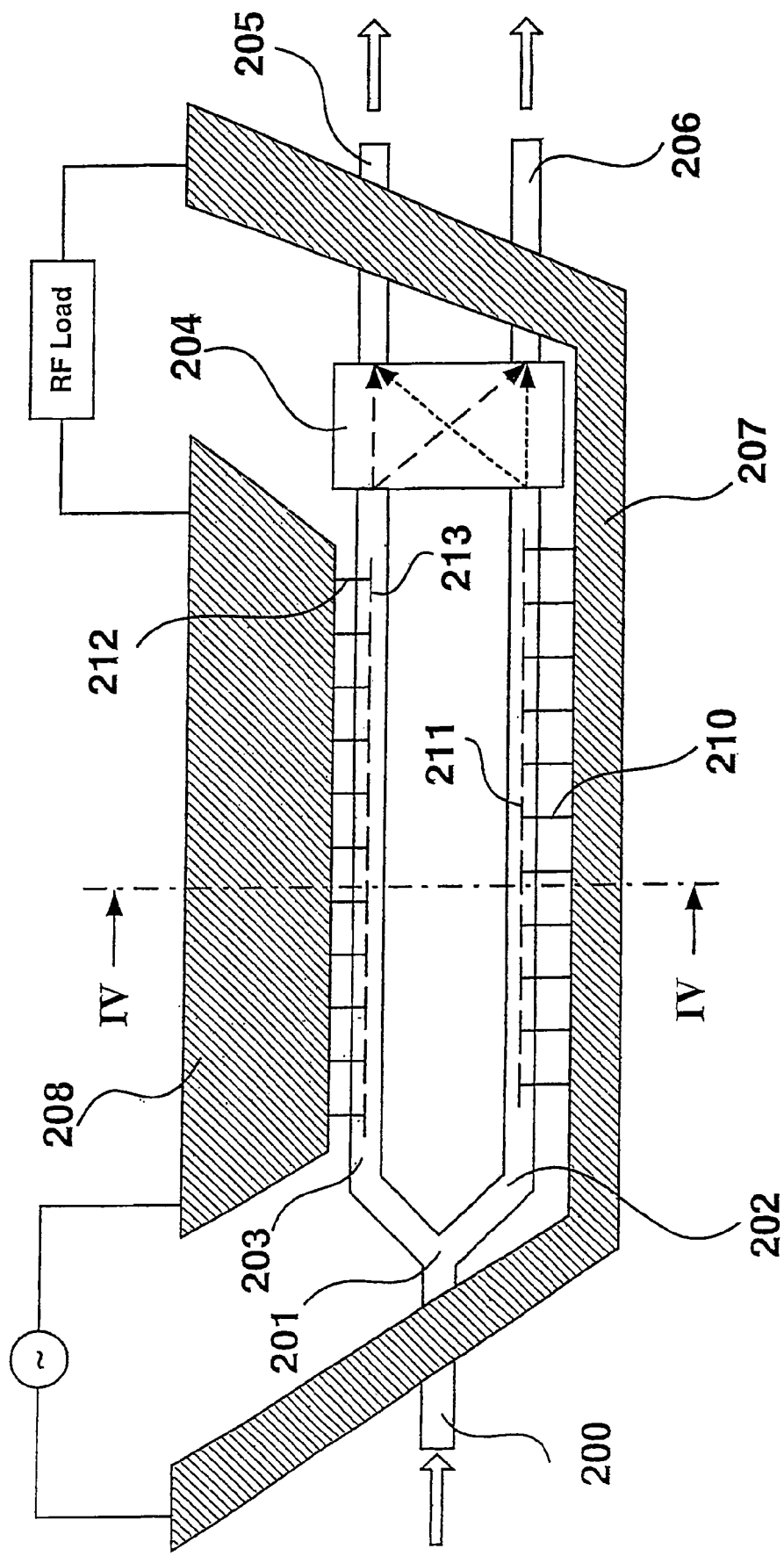
FIG. 3 is a plan view of a known travelling wave series push-pull modulator.

As shown in FIGS. 2–3, the two waveguides are thus connected back-to-back by the conductive doped n-type buried-layer. Layer 43 acts as the back contact for the top electrodes 45 & 46, these being rectifying metal-semiconductor contacts.

In operation the entire structure is electrically biased so as to maintain full depletion of carriers from the zones between 45 & 43 and 46 & 43. The electric field is thereby confined to the immediate vicinity of the guided light resulting in the highest possible electro-optic efficiency. The AC signal applied by generator 50 results in an AC ripple superimposed on the DC bias. This means that the field is always in the direction of arrows 251 (FIG. 2).

At high alternating signal frequencies, the depleted regions with their contacts 41, 40 and 43 act as capacitors, series connected across the RF supply. If these capacitances are equal, then half of the RF voltage is dropped across each respectively. Because of the directionally folded electrical path the resultant electro-optic effect within the two guides is antiphase i.e. the optical phase of one guide is advanced while that of the other guide is retarded.

When both electro-optic waveguides are contributing equally to the differential phase shift the modulator is said to operate in push-pull mode. The equal capacitive electrodes are series-connected across RF source, thus the effective capacitance is just half that due to each and the RF potential divides equally between the two sides. This balanced or antiphase phase modulation produces full intensity modulation upon recombination of the two paths at the output optical coupler, but without residual phase modulation, known as chirp.

Throughout it is assumed that the electrical signal is alternating and of sufficiently high frequency for the capacitive potential division described to occur. Where the electrodes are in the nature of lumped elements, the total capacitance presented to the external circuit imposes a natural limitation upon the frequency of operation. The capacitance C is very approximately equal to $$\varepsilon \frac{A}{d}$$

where $\varepsilon$ is the permittivity of the material, A is the area of the electrode on the rib (w times l) where w is as shown in FIG. 2 and l is the length of the electrode along the rib and the depletion depth d is the distance over which the electric field drops. The depletion depth d is also related to the cross-sectional depth of the waveguide and indirectly to the guided light spot size, since efficient modulation requires that the light be largely confined within the depletion zone.

The push-pull arrangement of electrodes may use separate RF power sources for the two sets of electrodes. However, beneficially, suitable parallel or series connections of the two pairs of electrodes may be applied to a single RF source. Each type of connection has its own particular advantages and disadvantages. The cases tabulated below illustrate the possibilities for geometrically symmetric devices of the same length.

1. Single-Sided Drive

A single drive (RF Voltage=V) to one arm only. Intensity modulation is proportional to V and the RF power required is proportional to $V^2$.

2. Dual-Drive Push-Pull

Independent, equal and opposite RF drives ($\pm\frac{1}{2}V$ each) to the two arms yields zero chirp and an intensity modulation proportional to V. The RF power required is proportional to $(\frac{1}{2}V)^2+(\frac{1}{2}V)^2$ i.e. $\frac{1}{2}V^2$ which is half that of Case (1).

3. Series Push-Pull.

If the two arms are series-connected, in a back-to-back manner, and driven from a single RF source, voltage V, as shown in FIG. 2, each arm drops half the RF voltage and they work in antiphase to give the same intensity modulation as both of the above cases but with no chirp. The RF power requirement is the same as (1) and twice that of (2) but the capacitance presented to the RF source, being a series chain, is half of either case, so the frequency-response of the device will have about twice the bandwidth.

4. Parallel Push-Pull.

If the two arms are cross-connected in parallel and driven from a single RF source, voltage $\frac{1}{2}V$, the arms work in antiphase to give the same intensity modulation as all of the above cases, again with no chirp. The RF power requirement is now only one quarter that of (1) or (3) and half that of (2). But the capacitance presented to the RF source is double that of the single-sided (unity chirp) case, so the device will have about half the bandwidth.

Table 1 below summarises this. Drive-voltage and bandwidth can generally be traded fairly freely in electro-optic modulator designs since both are inversely proportional to the electrode length. However, in terms of a bandwidth/power 'Figure of Merit', a chirp-factor of unity will always 'cost' a factor of two in intensity modulation efficiency, and all push-pull schemes are equivalent.

TABLE 1

| | Chirp | Power | Bandwidth (BW) | FIGURE of Merit (BW/Power Ratio) |
|---|---|---|---|---|
| Single Sided Drive | 1 | 1 | 1 | 1 |
| Dual Drive Push-Pull | 0 | ½ | 1 | 2 |
| Series Push-Pull | 0 | 1 | 2 | 2 |
| Parallel Push-Pull | 0 | ¼ | ½ | 2 |

In practice the waveguides have eventually to be optically coupled to a fibre optic cable which has a core diameter of 9 to 10 microns. To couple the two together a lens is used but ideally the optical spot size should be as large as possible to ease the coupling and mechanical stability problems when the device is coupled to the optical fibre.

However, a large spot size will enforce a large value of depletion depth d, thereby moving the design to the high voltage, low capacitance, therefore high speed, end of the design space. The parallel push-pull method of this invention can be used to move the design back to the low voltage, low speed regime without the use of excessive device length.

Effectively the invention does this by
  a) cutting the in-built back-connection between the waveguides,
  b) engineering a bottom-to-top connection to enable the parallel cross-connection.

There are public-domain examples of both series and parallel push-pull electrode arrangements in modulators that are based on pure dielectric materials such as lithium niobate. There are also examples based on undoped, i.e. essentially insulating semiconductors such as GaAs. These examples have in common:

1. Only fringing fields are available for modulation, which limits efficiency
2. Lacking in-grown conductive layers, there is no difficulty in engineering parallel cross-connections.
3. Lacking in-grown conductive layers, there is great difficulty in concentrating the electric-field lines into the region of optical confinement.

The structure of the present invention uses in-grown conductive doped semiconductor layers as the back contact for both electrodes. This effectively drops the applied E-field directly down through the confined light profile leading to a high efficiency but means that novel means have to be provided as shown below to engineer a parallel push-pull configuration owing to the normally in-built series connection through the doped region.

The GaAs/AlGaAs electro-optic modulator as described in Reference 1 above shows a typical GaAs—AlGaAs MZI such as that shown in FIG. 2 of the accompanying drawings. This has an inherent built-in back-connection bet+ween the two arms of the interferometers comprised of a layer of conductive n-type doped semiconductor material just beneath the waveguides, which is necessary to confine the applied electric field to the guided-wave region. Thus, the native mode of operation of GaAs/AlGaAs electro-optic modulators is series push-pull. This tends to be excellent for high-speed devices but does not readily yield short or low-power devices due to the limited electro-optic effect in GaAs.

This known structure is illustrated in FIG. 3 showing a plan view of a series, push pull modulator configuration in the GaAs/AlGaAs material system. In FIG. 3 the incoming light passing along waveguide 200 is split as at 201 to pass along waveguides 202 and 203. Light is recombined by coupler 204 and passes out through waveguides 205 and 206, the division of light between the two waveguides is determined by the applied voltage. A pair of metal rails, 207 and 208 are connected to a RF source. These rails correspond to the 'hot' and 'ground' conductors of a co-planar microwave transmission line system for high frequency operation. The two structures 210 and 212 are metal air bridges that extend over the deep trenches etched in the semiconductor material and respectively connect rail 207 with electrodes 211 and rail 208 with electrodes 213.

FIG. 3 shows a travelling-wave modulator configuration, in which the RF wave, launched at one end of the structure is absorbed at the other by means of proper termination with a resistor equal to the characteristic impedance of the transmission-line. i.e. reflection of the RF wave back along the structure is prevented.

A high modulation bandwidth can be reconciled to a low drive voltage by use of such a structure if the RF phase velocity is matched to the optical group velocity. Such velocity matching enables the modulation to be accumulated over a very long interaction as a given RF voltage level is thereby enabled to keep in step with the optical modulation group which it is creating.

Reference 3 thus illustrates a design of a semiconductor device not in accordance with the invention using the series push-pull GaAs/AlGaAs technology described herein.

The multiple electrodes 211, 213 shown in FIG. 3 provide periodic capacitive loading, thereby generating a RF slow-wave line that enables velocity matching in coplanar semiconductor systems. Since the degree of slowing depends on the capacitance, this is a crucial parameter in travelling-wave modulator systems, as much as with simpler 'lumped' devices.

Figure 4:
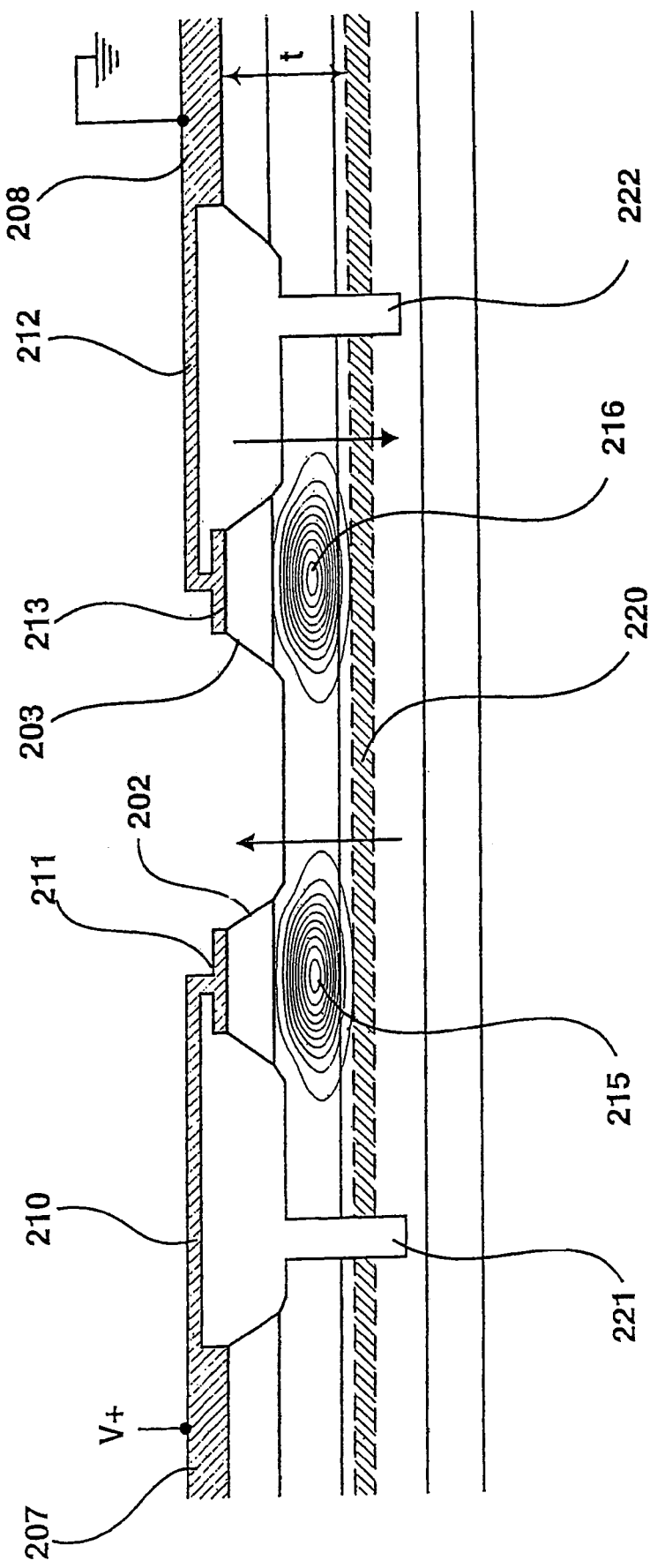
FIG. 4 is a sectional view of FIG. 3 along the line IV—IV showing the isolation trenching needed for high-speed operation.

FIG. 4 shows a cross-sectional view of the structure shown in FIG. 3. The structure has a lower conducting layer 220 which is cut by trenches 221 and 222, so that the electrical path between transmission line rails 207 and 208 is constrained to be via the active elements. Without the trenches a direct 'short' path would exist across the transmission line owing to the strong capacitive coupling between 207, 208 and the doped layer below.

Figure 5:
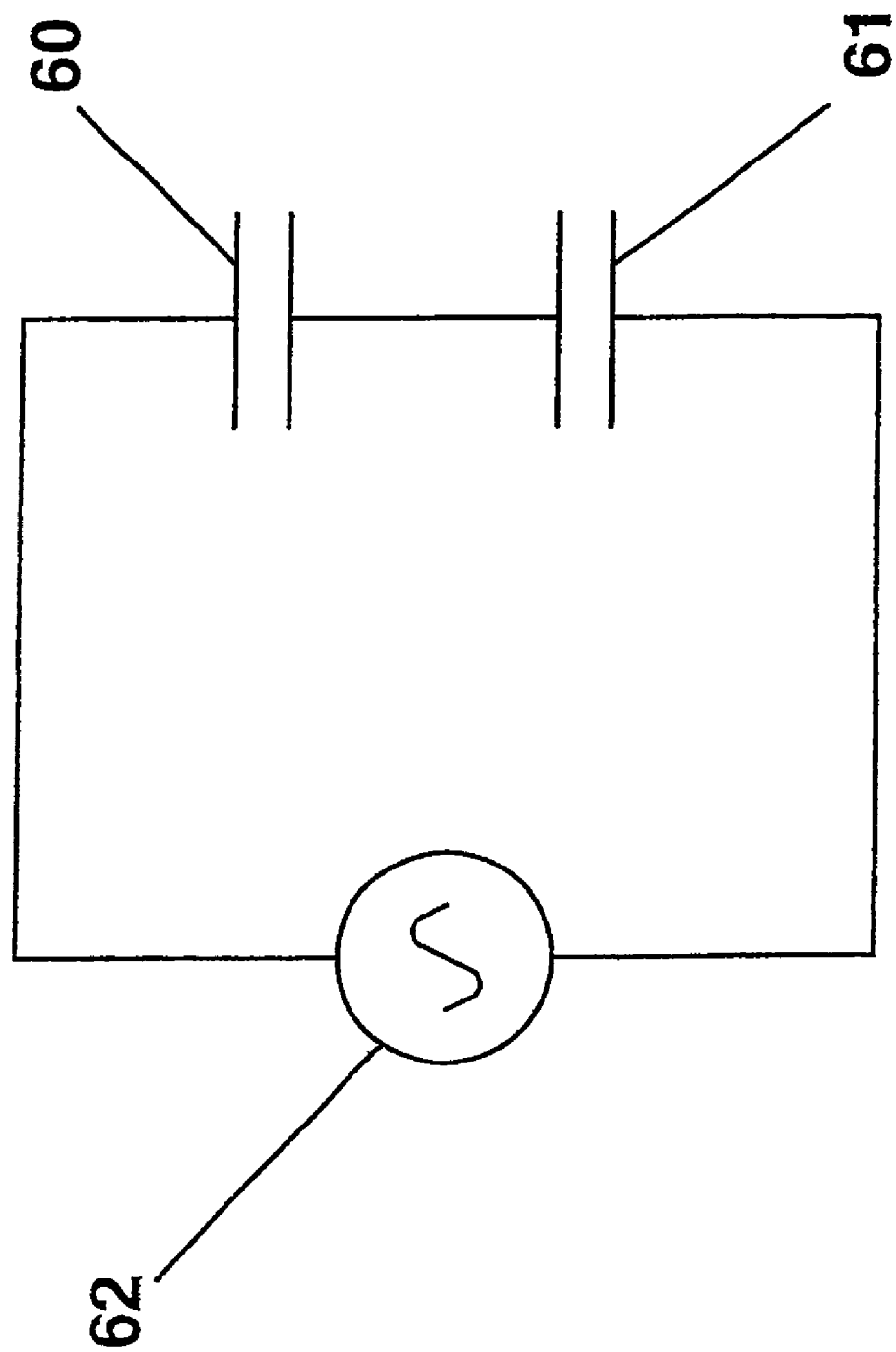
FIG. 5 shows an equivalent circuit of the series push-pull design shown in FIG. 3.

In the arrangement illustrated in FIG. 4 the equivalent electrical circuit can be shown as in FIG. 5 where the two capacitive elements 60, 61 represent the two electrode pairs and the RF source is shown at 62. Thus the two electrode pairs are series connected.

A first embodiment of the invention will now be described with reference to FIGS. 6 and 7.

Figure 6:
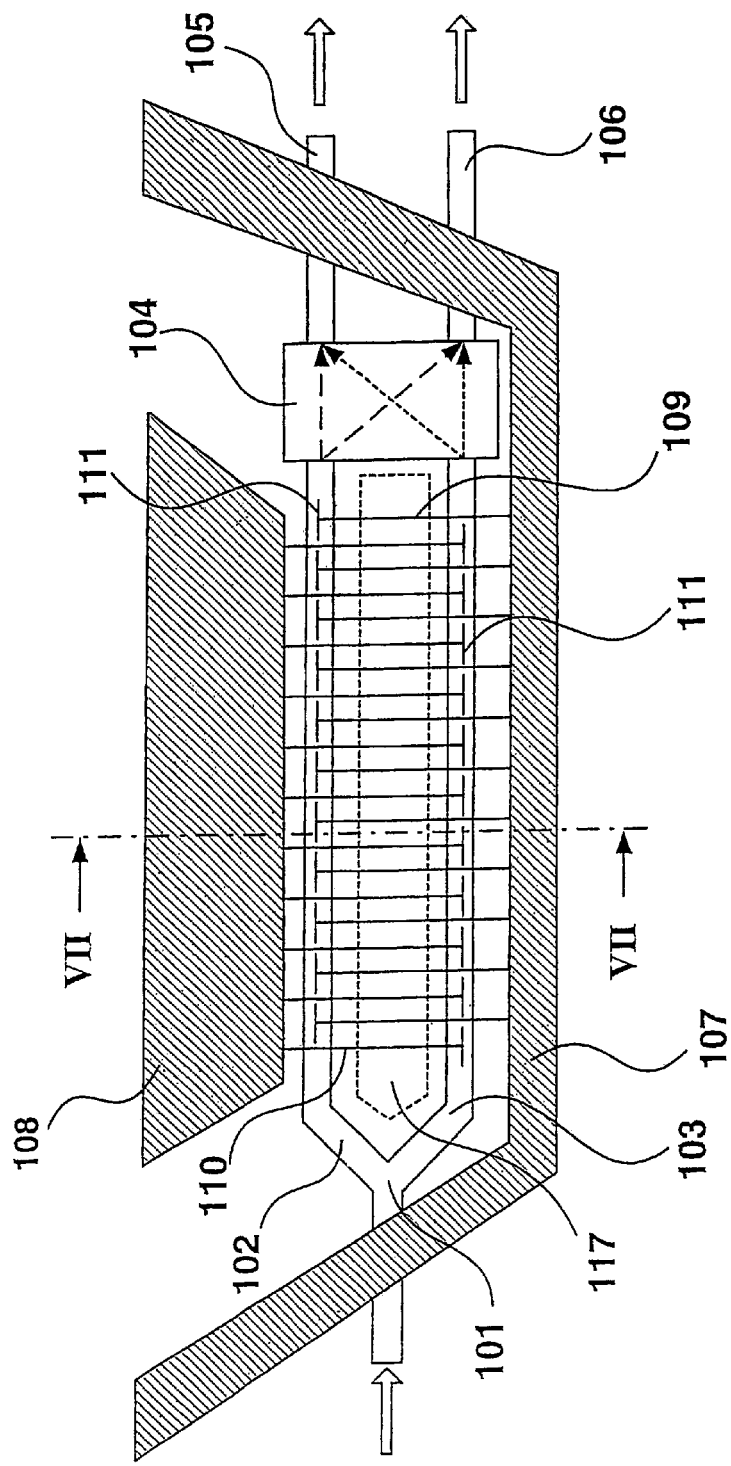
FIG. 6 shows a plan view of a form of modulator in accordance with a first embodiment of the invention.

FIG. 6 shows a plan view of a parallel, push-pull modulator configuration in the GaAs/AlGaAs material system. The optical modulation function is identical to that described in FIG. 3 and has already been described in that context.

A pair of RF-rails or transmission lines, 107 and 108 are connected to a RF source (not shown). These transmission lines correspond to the 'hot' and 'ground' conductors of a coplanar microwave transmission line system for high frequency operation. The transmission lines 107, 108 are terminated in a characteristic impedance resistive load (not shown).

Figure 7:
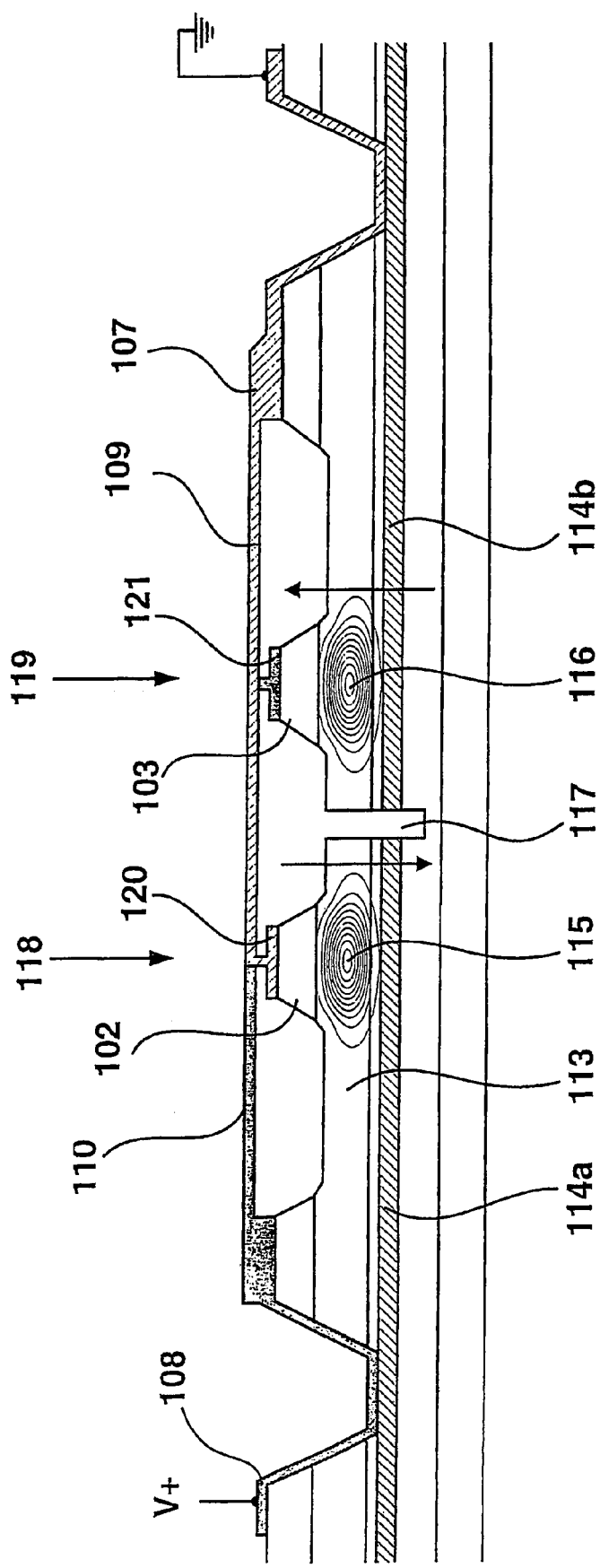
FIG. 7 is a cross-section of the embodiment of FIG. 6 taken along the line VII—VII.

FIG. 7 shows the cross-section at cut VII—VII. Structures 109 and 110 are metal connection links between electrodes and the more remote of the two transmission-line rails 107 and 108. Each link, 109 and 110, includes an air-bridge section in order to span an isolation-trench 117 placed between the two waveguides of the Mach-Zehnder interferometer, and passively crosses the other waveguide of the pair.

In this configuration there are no trenches between each waveguide and the adjacent transmission-line rail. The unbroken conductive layer 114 serves to connect the back-connection of each waveguide to the RF source. It may be seen from FIG. 7 that waveguide 115 has a top-connection to ground and a back-connection to $V^+$ while waveguide 116 has a top-connection to $V^+$ and a back-connection to ground. They are therefore oppositely poled by the same voltage-source and are effectively cross-connected in parallel. It should be note that the two separated regions of conductive layer 114, 114a and 114b, are at opposite RF polarities, hence the necessity for the trench 117.

114a and 114b must eventually be merged into contiguity at splitter 101 and recombiner 104. This will cause an electrical conflict unless either:
  i. A technique such as ion implantation is used to locally remove the conductivity near the merge, or
  ii. Sufficiently long passive waveguide regions, trenched on both sides, are incorporated between the active region and the merge zones. The sheet resistance due to the conductive layer can be made sufficiently high that the effective resistance across the RF transmission-line is several hundreds of Ohms. Long passive regions of this type also offer increased isolation at high frequencies due to their inductive reactance.

A second embodiment of the invention will now be described with reference to FIGS. 8 and 9.

This second embodiment avoids the need for connections crossing over the other waveguide and makes use of the potentially superior RF properties of the Coplanar Waveguide (CPW) form of transmission-line. CPW has lower loss, lower dispersion and a reduced tendency to radiate compared with the two-conductor coplanar stripline (CPS) used in the first embodiment. CPW uses two RF ground-planes 80 and 82, one either side of the central conductor 81.

Figure 9:
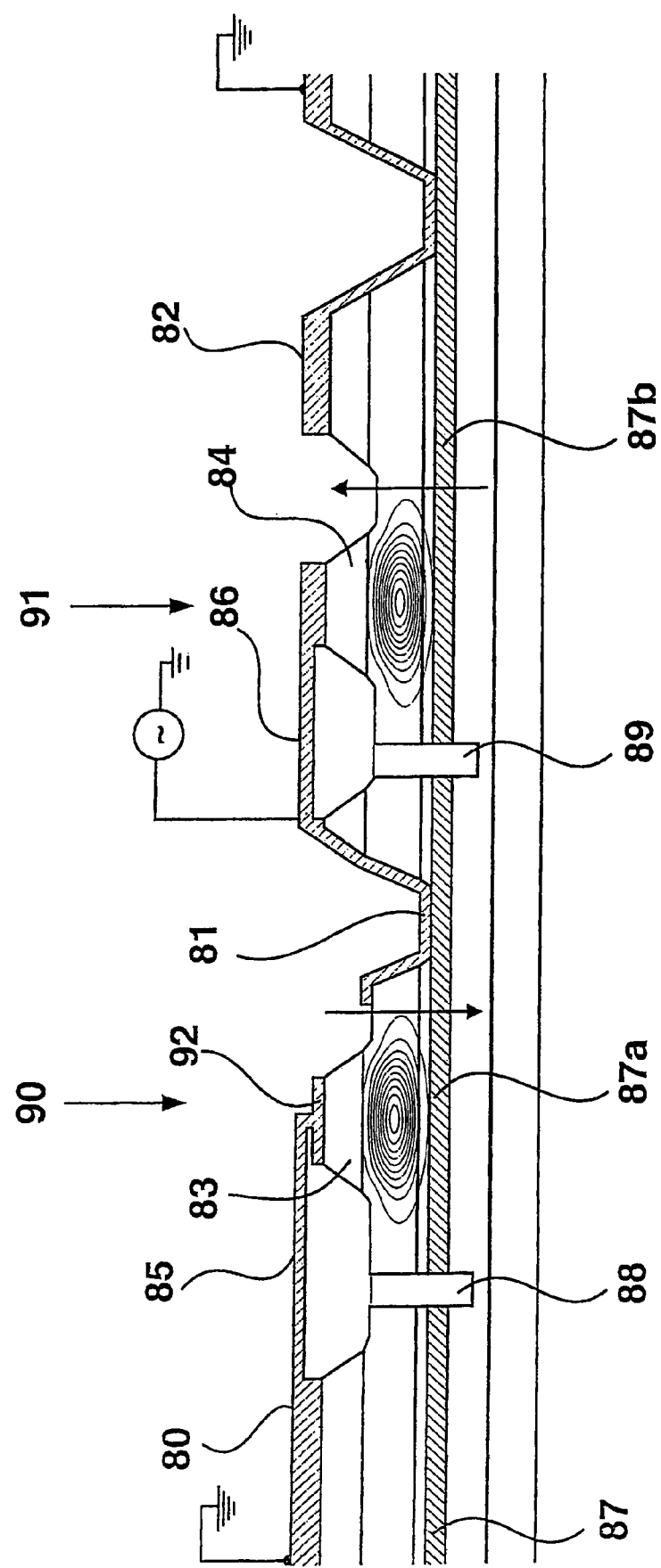
FIG. 9 shows a cross section of the second embodiment of FIG. 8 taken along the line IX—IX.

The central RF conductor 81 runs between the two optical waveguides and is electrically connected to the top electrode of one, but to the back electrode of the other as shown in FIG. 9. As with the first embodiment, an isolation-trench 89 separates the two waveguides electrically enabling the waveguides to be oppositely poled.

The second embodiment features a second trench 88, which isolates the second ground-plane 80 from the waveguide 83 to which it makes top-contact.

On one side the unbroken conductive layer 87b serves to link the back-plane of waveguide 84 to the RF ground-plane 82. Waveguide 84 top-connection to $V^+$ (RF centre-conductor) is via air-bridge 86 crossing trench 89. Waveguide 83 is oppositely poled, having a top-connection to ground using the second ground-plane 80 and a direct back-connection to $V^+$ to which it has untrenched access.

Active regions of conductive layer 87, 87a and 87b, are at opposite RF polarities—hence the necessity for the trench 89. The remaining region of conductive layer 87 beneath ground-plane 80 is passive, but is adjacent to region 87a, which is at the opposite potential and therefore must be isolated by means of trench 88.

Regions of conductive layer 87, 87*a* and 87*b*, though at opposite RF polarities must eventually be merged into contiguity at splitter and recombiner. Again, this will cause an electrical conflict unless either:

i. A technique such as ion implantation is used to locally remove the conductivity near the merge, or ii. Sufficiently long passive waveguide regions, trenched on both sides, are incorporated between the active region and the merge zones. The sheet resistance due to the conductive layer can be made sufficiently high that the effective resistance across the RF transmission-line is several hundreds of Ohms. Long passive regions of this type also offer inductive isolation at high frequencies.

Figure 10A:
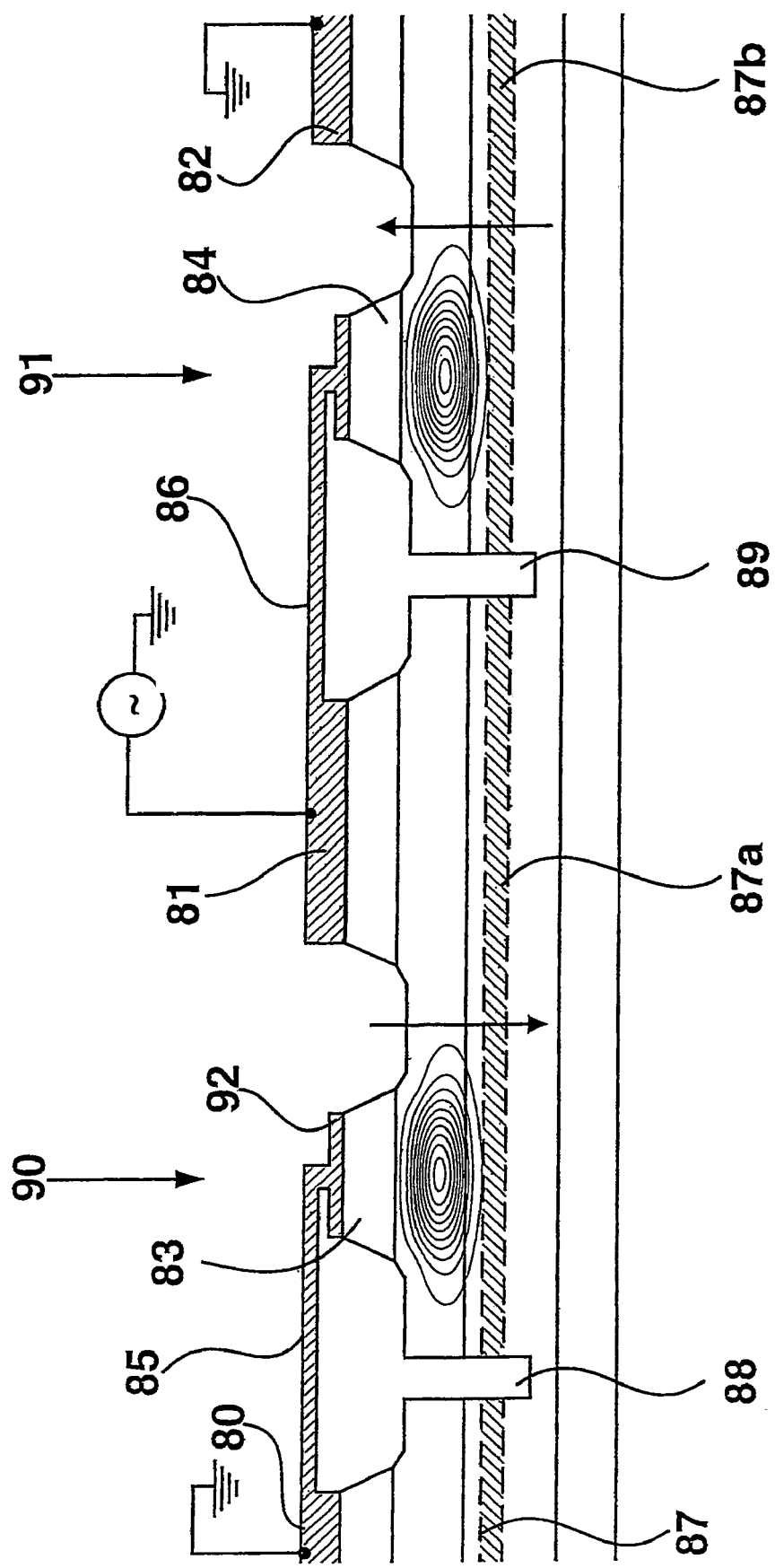
FIG. 10a shows a cross section of a third embodiment derived from the design shown in FIG. 8 taken along the line IX—IX.

A third embodiment of the invention will now be described by reference to FIG. 10*a*. In the foregoing descriptions of the CPS and CPW style coplanar RF transmission-line embodiments shown in FIGS. 6–9, contacts to the buried conductive layer (variously 87*a,b* or 114*a,b*) have been assumed to be ohmic, achieved by etching down to the buried conductive layer and deposition the metallisation into the resulting "pit".

Figure 8:
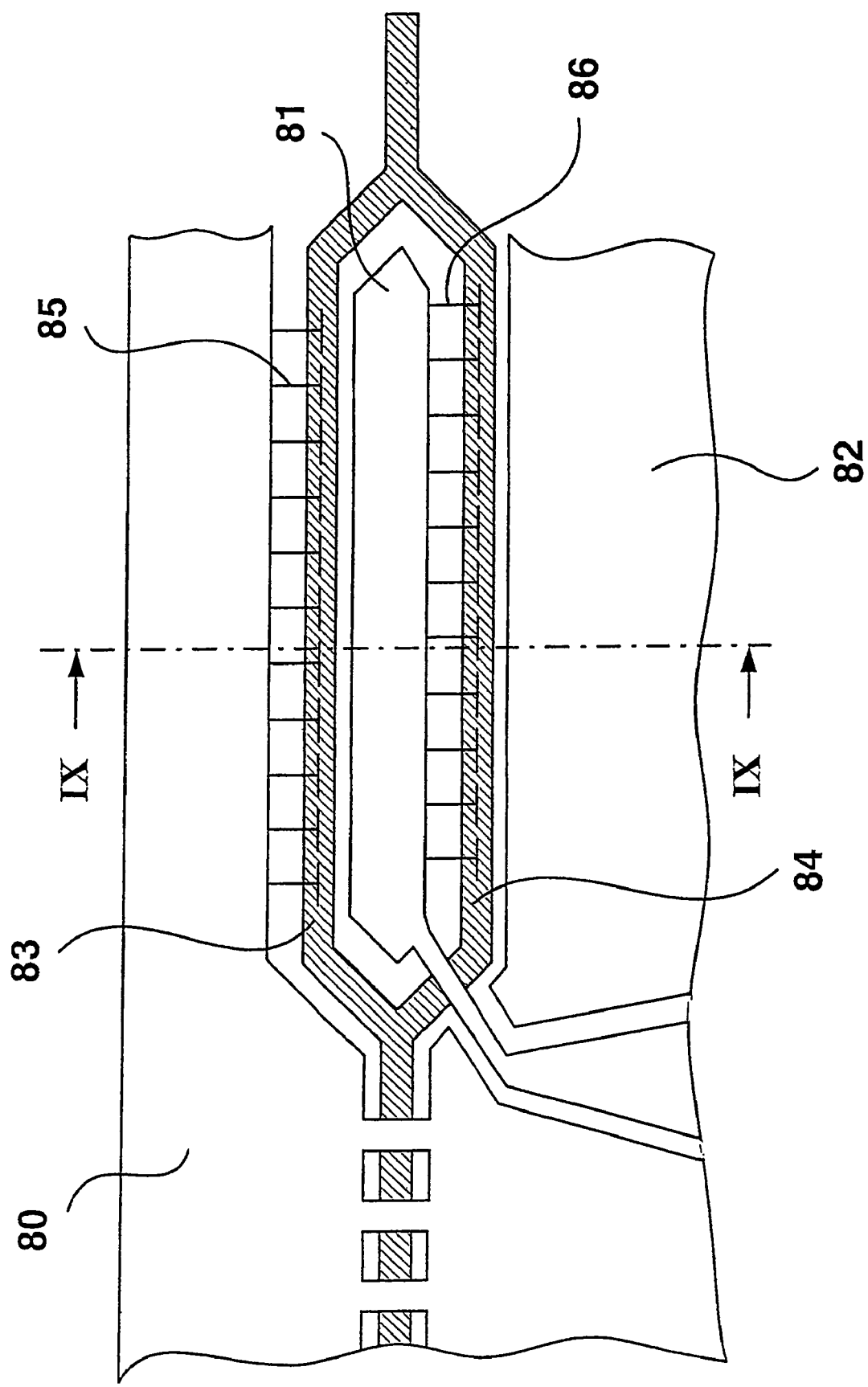
FIG. 8 shows a plan view of a form of modulator in accordance with a second embodiment of the invention.

Consider the CPW style coplanar RF transmission-line design shown in FIG. 8. For high frequency modulation provision of these ohmic contacts may be avoided, through exploitation of the fact that the planar electrodes cover a large area compared to the active electrodes above the optical waveguides. The active electrodes are typically 4 µm wide while the coplanar planes may be 100 µm or considerably more in width. It is possible to deposit the coplanar transmission-line planes onto the original surface in the same way as the active electrodes, occupying a common layer level. Because the vertical separation d shown in FIG. 2, between the waveguide top active electrodes (and therefore the coplanar RF transmission-line planes) and the conductive layer is only of order 2 µm, the conductive layer is intimately coupled at RF frequencies to the metal above due to the capacitive influence. Thus it is only necessary that the RF transmission-line planes width be much greater than that of the active electrodes, to avoid the need to provide ohmic contacting to the conductive layer, and instead rely upon the capacitive coupling to provide the requisite RF connections. This offers a simplified fabrication process. FIG. 10*a* schematically shows such a cross section of such a device based upon the design of FIGS. 8 and 9. In particular the central RF conductor 81, is fabricated to be at least an order of magnitude wider than that of the active electrodes above the optical waveguides.

In addition, such an embodiment may offer superior performance at lower modulation frequencies where any contribution to isolation due to inductance of long passive trenched sections at the waveguide merge points will fail. In this embodiment, the RF short is via capacitive coupling, which also fails at low frequencies. Note however that device function will not fail at low frequencies as the reactive current drawn by the active waveguides is reduced in proportion; only the ratio of electrode width to coplanar-contact width is of consequence.

Figure 10B:
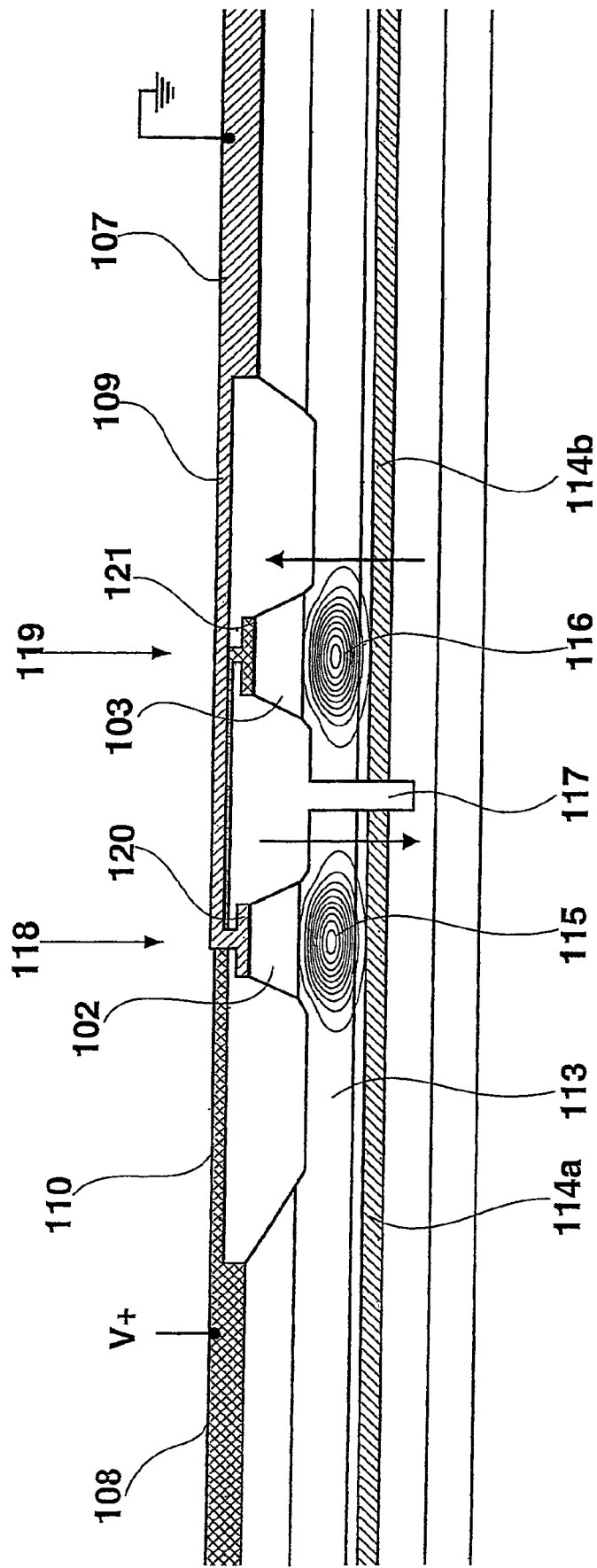
FIG. 10b shows a cross section of a fourth embodiment derived from the design shown in FIG. 6 taken along the line VII—VII.

A fourth embodiment of the invention is disclosed by reference to FIG. 10*b*, in which the CPS style coplanar RF transmission-line design shown in FIG. 8 is reduced to an easier to fabricate architecture based upon the physical arguments advanced for the third embodiment, and wherein the coplanar RF transmission-line rails are at least an order of magnitude greater in width than the active electrodes above the optical waveguides. This fourth embodiment similarly offers improved low frequency modulation performance, as with the third embodiment.

Figure 11:
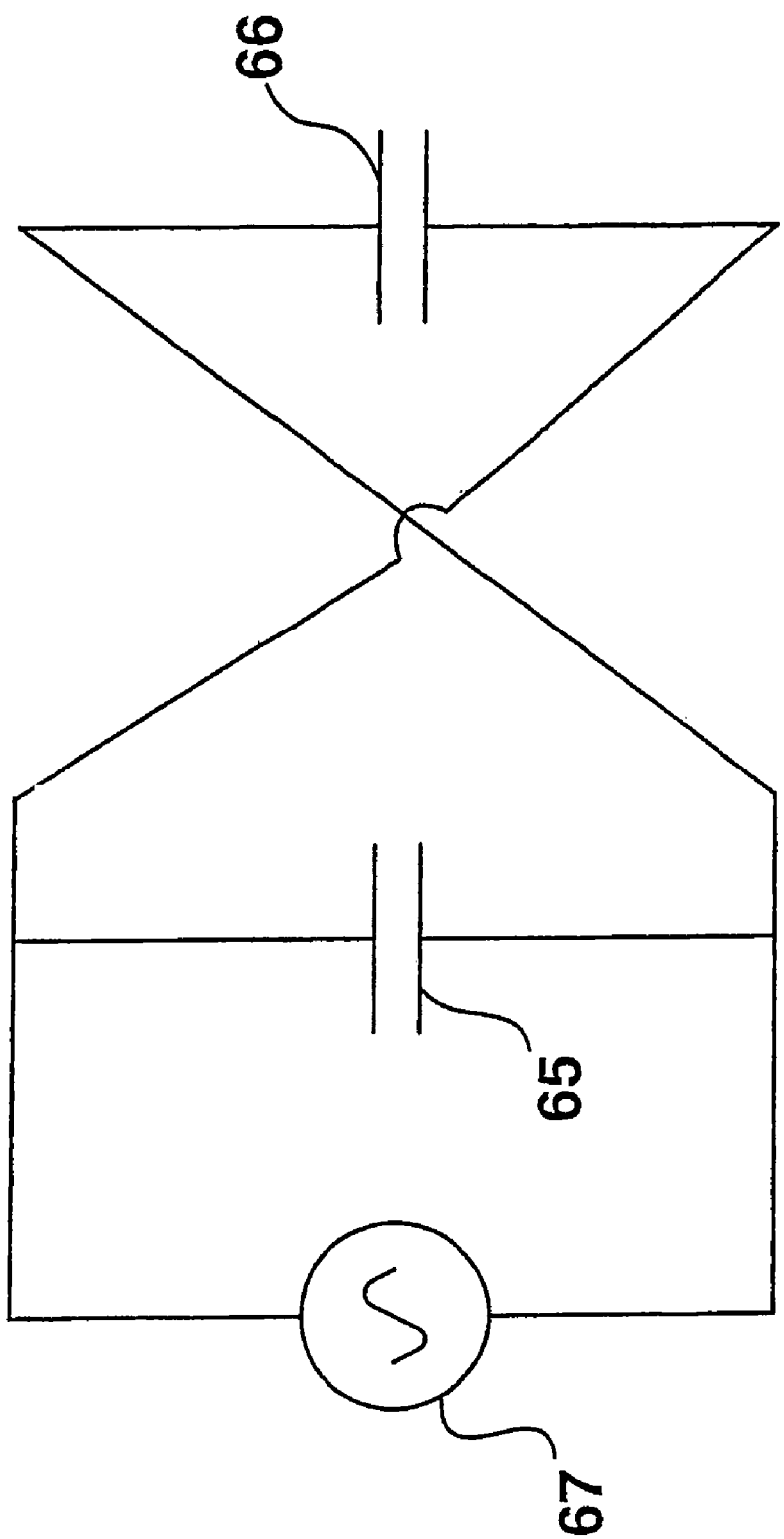
FIG. 11 shows an equivalent circuit of the series push-pull design shown in FIGS. 6–10.

In the arrangement illustrated in FIGS. 6 to 10 the equivalent electrical circuit can be shown as in FIG. 11 where the two capacitive elements 65, 66 represent the two electrode pairs and the RF source is shown at 67. Thus the two electrode pairs are push-pull connected.

The invention claimed is:

1. A Mach-Zehnder interferometer modulator for modulating a beam of laser light, the modulator comprising a pair of separate waveguides through which the laser light is passed after splitting in a splitting zone and after which the light is recombined in a merge zone, the waveguides being formed of a material having electro-optic properties and there being provided opposed pairs of electrodes electrically located so as to be able to effect optical changes within the material of the waveguides, wherein the waveguides are formed in a semiconductor in a semiconductor material with one of the electrodes of each pair being formed in a doped layer, said doped layer being of relatively high conductivity compared to the semiconductor material, buried within or below the waveguide material whilst the other electrode, a top electrode, is a surface metalisation, the doped layer being trenched so that adjacent electrodes in the doped layer are electrically isolated from one another so that one of the electrodes in the doped layer can be connected with a different electrical polarity to the other electrode in the doped layer thereby permitting the connection of the pairs of electrodes in parallel anti-phase mode.

2. The modulator as claimed in claim 1, further comprising a coplanar stripline transmission-line for an RF signal comprising a pair of metal rails arranged on either side of the pair of waveguides, each rail effecting direct contact to the buried electrode of the adjacent waveguide while also effecting contact to the top electrode of the remote waveguide by means of metal linkages passing through or over the adjacent waveguide.

3. A modulator as claimed in claim 1, further comprising a coplanar waveguide transmission-line for an RE signal having three rails, a central rail at one potential and located between the waveguides, and two outer rails at the same, second, potential which differs from the first potential, with each waveguide of the pair of waveguides running in one of the two inter-rail gaps, the central rail effecting direct contact to the buried electrode of the first waveguide and contacting the top electrode of the second waveguide by means of metal linkages, the top electrode of the first waveguide being contacted by means of metal linkages from the first outer rail, and the second outer rail being in direct contact to the buried electrode of the second waveguide.

4. The modulator as claimed in claim 3, wherein the doped layer extends beneath the first outer rail, and there is provided a trench through the doped layer so as to isolate the region of the doped layer beneath the first waveguide form that beneath the first outer rail.

5. The modulator as claimed in claim 1, further comprising a coplanar stripline transmission-line for an RF signal having a pair of metal rails arranged on either side of the pair of waveguides, each rail having a width sufficient to enable capacitive connection to the buried electrode over which it is located and effecting thereby high frequency contact to the buried electrode of the adjacent waveguide while also effecting contact to the top electrode of the remote waveguide by means of metal linkages passing through or over the adjacent waveguide.

6. The modulator as claimed in claim 1, further comprising a coplanar waveguide transmission-line for an RF signal comprising three rails, a central rail at one potential and located between the waveguides, and two outer rails at the same, second, potential, with each waveguide of the pair of waveguides running on one of the two inter-rail gaps, the central rail and one of the outer rails being of sufficient width to enable those rails to make capacitance contact with their opposed buried electrodes, the central rail effecting capacitive contact to the buried electrode of the first waveguide and contacting the top electrode of the second waveguide by means of metal linkages, the top electrode of the first waveguide being contacted by means of metal linkages from first outer rail, and the second outer rail being in capacitive contact to the buried electrode of the second waveguide, the capacitive contacts being effective electrical contacts for high frequency alternating signals.

7. The modulator as claimed in claim 6, wherein the doped layer extends beneath the first outer rail, and there is provided a trench through the doped layer so as to isolate the region of the doped layer beneath the first waveguide from that beneath the first outer rail.

8. The modulator as claimed in claim 1, wherein the pair of separate waveguides comprises an active region and a passive region, the passive region being arranged between the active region and the merge zone.

9. The modulator as claimed in claim 1, wherein the pair of separate waveguides comprises an active region and a passive region, the passive region being arranged between the active region and the splitting zone.

10. The modulator as claimed in claim 1, wherein the conductivity in the doped area is locally removed in the region of the merge zone.

11. The modulator as claimed in claim 1, wherein the conductivity in that doped area is locally removed in the region of the splitter zone.

12. The modulator as claimed in claim 1, wherein the semiconductor material is based on GaAs, and the waveguides are formed in GaAs bounded by layers of AlGaAs.

13. The modulator as claimed in claim 1, wherein the semiconductor material is selected from the group InGaAsP, or GaInAsP or GaAlInP and the bounding layer is InP.

14. The modulator as claimed in claim 1 wherein the electrode formed by surface metalisation is a Schottky rectifying contact.

15. The modulator as claimed in claim 1, wherein the electrode formed by surface metalisation is an ohmic contact to a p-doped under layer.

* * * * *